US006219306B1

(12) United States Patent
Kwiatkowski

(10) Patent No.: US 6,219,306 B1
(45) Date of Patent: Apr. 17, 2001

(54) DEVICE FOR PROJECTING A DYNAMIC SPECTRAL DISPLAY

(76) Inventor: Zdzislaw Kwiatkowski, 574 Morgan Ave., Apt. #2R, Brooklyn, NY (US) 11222

( * ) Notice: Subject to any disclaimer, the term of this patent is extended or adjusted under 35 U.S.C. 154(b) by 0 days.

(21) Appl. No.: 09/233,819

(22) Filed: Jan. 20, 1999

(51) Int. Cl.[7] .......................... G04B 19/00; G04B 19/06; G03B 21/00

(52) U.S. Cl. .......................... 368/223; 368/228; 368/229; 368/79; 353/46

(58) Field of Search .............................. 368/79, 82, 223, 368/228, 229, 238, 239, 232; 353/40, 41, 44–45, 46, 81

(56) References Cited

U.S. PATENT DOCUMENTS

| | | | | |
|---|---|---|---|---|
| 2,694,338 | * | 11/1954 | Moultry et al. | 368/79 |
| 4,217,040 | * | 8/1980 | Longerbeam | 353/46 |
| 5,160,950 | * | 11/1992 | Niizawa | 353/81 |
| 5,247,491 | * | 9/1993 | Kwiatkowski | 368/79 |
| 5,253,000 | * | 10/1993 | Stoeckner | 35/46 |
| 5,550,605 | * | 8/1996 | Haraguchi et al. | 353/81 |

FOREIGN PATENT DOCUMENTS

| | | | | |
|---|---|---|---|---|
| 36946 | * | 10/1981 | (EP) | 368/79 |

* cited by examiner

*Primary Examiner*—Vit Miska
*Assistant Examiner*—Jeanne-Marguerite Goodwin

(57) ABSTRACT

A device for projecting spectral display onto a viewing surface, having numerous light projecting segments attached to rotating hollow shafts, mounted and rotating upon each other on coaxial based shaft. The projecting segments include a light emitting source to produce light rays, a light convergent member such as lens and a diffraction member such as prism or diffraction gratings, for effecting spectral dispersion of the light rays for projecting same onto viewing surface to create the spectral display in a motion or a dynamic spectral display.

The rotating hollow shafts provide built-in electrical wiring tracks and a connection to energize the light source, and they also provide mechanical connection through geared wheel to receive power to effect the rotating motion. The projecting segments with their respective rotating shafts are accommodated inside a casing or a housing of the device, which can be individual or portable. The device can also be incorporated, fasten down or mounted to the a wall, a ceiling and operate within architectural spaces.

Depending on the number of the light projecting segments and their specific structure or design, the spectral display in one embodiment creates an image of spectral clock's dial display, and in another embodiment the spectral display forms artistic, abstract display in the motion of the dynamic spectral display.

12 Claims, 3 Drawing Sheets

DEVICE FOR PROJECTING A DYNAMIC SPECTRAL DISPLAY

CROSS-REFERENCE TO RELATED APPLICATION

This application relates to Disclosure Document No. 411798 received by Patent Office on Jan. 24, 1997 and filed by Applicant.

BACKGROUND OF THE INVENTION

The invention relates to spectral light projecting devices onto a viewing surface, and more specifically, to devices for projecting a spectral display, that is in a motion to create or form a dynamic spectral display or an image of it, on the viewing surface.

The device is made up of spectral light projecting segments attached to rotatable hollow shafts, which are mounted and rotating on coaxial based shaft, and thus composing rotating spectral projecting segments. Each rotating segment provides built in electrical wiring and a connection to energize a light emitting source, and also mechanical power to effect a rotating motion of the projecting segment. The projecting part of the rotating segment includes the light emitting source for projecting the light rays onto diffraction means such as a prism or diffraction gratings to cause a spectral dispersion of the light rays for projecting the same onto the viewing surface to create spectral display in the motion or the dynamic spectral display.

There are devices for projecting the spectral display, but they do not provide a novel improvement of the invention herein introduced.

The U.S. Pat. No. 5,247,491 issued on Sep. 21, 1993 disclosed the spectral display, which is based on a static arrangement of the projecting segments, and the presently proposed modification is quite different or unique, and was not indicated in the former patents at all.

Essentially, none of the prior art discloses proposed herein a new design of the projecting spectral display, wherein the spectral projecting segments are connected or integrated with the rotating motion means.

SUMMARY OF THE INVENTION

It is an object of the present invention to provide a device for projecting spectral display, that is in a motion or a dynamic spectral display onto a viewing surface, which is not accomplished by the prior art devices.

Another object of the present invention is to provide a device for projecting spectral display, having at least three coaxially rotating projecting segments, this is able to create a spectral image of a clock's dial on a viewing surface.

A further object of the present invention is to provide a spectral display in the motion as indicated above, wherein the device has a number of spectral projecting segments accommodated on coaxial rotating shafts to create an artistic or abstract dynamic spectral display.

Yet another object of the present invention is to provide a device as described above, wherein a number of coaxially combined projecting segments with different spatial orientation are projecting a dynamic spectral display onto the viewing surface.

Another object of the present invention is to provide a device, which is simple to manufacture and is economically affordable.

And yet another object of the present invention is to provide a device for projecting dynamic spectral display, which is embodying a practical, useful function with esthetic merits.

Accordingly to the present invention, the device for projecting the spectral display in the motion or the dynamic spectral display, is comprising of many spectral projecting segments each attached to a rotating hollow shaft mounted together and rotating in a coaxial manner.

Each projecting segment of the device includes, a light emitting source to produce light rays, light convergent means such as a condensing lens, and diffraction means such as a prism or diffraction gratings to effect spectral dispersion or diffraction of the light rays for projecting same onto a surface exposed to viewing or simply, a viewing surface.

The rotating hollow shafts provide built-in electrical wiring tracks and electricity conductive rings connected to electrical brushes to enable to energize the light source while it is in the rotating motion. The rotating shafts are powered and driven by the device's controlling mechanism through a geared wheel. An outside electrical power is supplied through an electrical socket accommodated in the a casing or housing of the device.

In a preferred embodiment, the device in a clock, with the projecting segments arranged in relative and corresponding order to each other and rotating in coaxial manner to project a desired time display onto the viewing surface. The clock's like spectral display, has a particular structure of three coaxially rotating spectral projecting segments, so that energizing their respective light sources provides a second indicating hand, a minute indicating hand and an hour indicating hand of the spectral time display.

In another embodiment, the device having many projecting segments arranged as described above, combined and acting together with projecting segments of different spatial orientation in relationship to each other, is projecting the dynamic spectral display or the variety of it.

BRIEF DESCRIPTION OF THE DRAWINGS

With the above stated and extra objects and advantages in view, as will hereinafter appear, this invention comprises the devices, combinations and arrangements of components hereinafter described by the way of example and illustrated in the accompanying drawings of preferred embodiments in which.

In the various FIGURES of the drawings, like reference characters designate like components.

DESCRIPTION OF THE PREFERRED EMBODIMENTS

Figure 1:
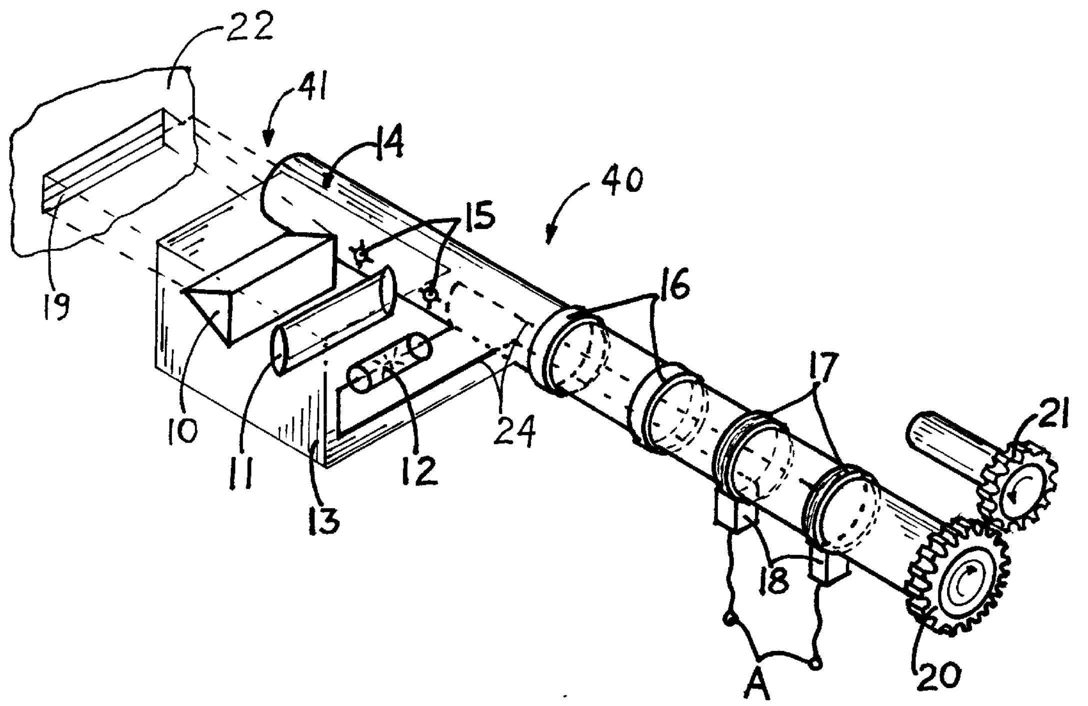
FIG. 1 is a diagrammatic exploded perspective view of a rotating projecting segment of a device for projecting a spectral display in accordance with the present invention.

Referring to the drawings, FIG. 1 shows an entire rotating spectral projecting segment 40, that is composed of a rotating hollow shaft 14 and a spectral projecting segment 41, which are mounted in a device for projecting a spectral dynamic display 19 onto an exposed surface to viewing 22, according to the present invention. The spectral projecting segment 41, as well as the components of it mentioned below, include a light emitting source 12, such as a light bulb, which is connected by electrical wires 24 to electricity conducting rings 17 then connecting through the electrical brushes 18 to electrical energy supply terminals (A) in a manner well known in the art. A light convergent means such as lens 11 is disposed in a predetermined distance between light source 12 and diffracting means such as a prism 10, a diffraction gradings and the like. The convergent light incidents onto the diffraction means 10, thus effecting a spectral dispersion or diffraction of the light for projecting same onto the viewing surface 22 to create the spectral display 19.

The projecting segment 41 is mounted inside of an opaque housing or box 13, with an opening, and attached to a rotating hollow shaft 14, by help of the attachment means 15, such as screws, glue and the like. The hollow shaft 14 provides built-in electrical wiring tracks 24 and connection to energy for the light emitting source 12, as well mechanical energy for a rotating motion through a geared wheel 20 powered by geared wheel 21 of the device's controlling mechanism. The segment 40 is one of the coaxial members of the device for projecting the dynamic spectral display and rotates with synchronized or various speeds of the motion with another similar segments for projecting a desired dynamic display.

Figure 2:
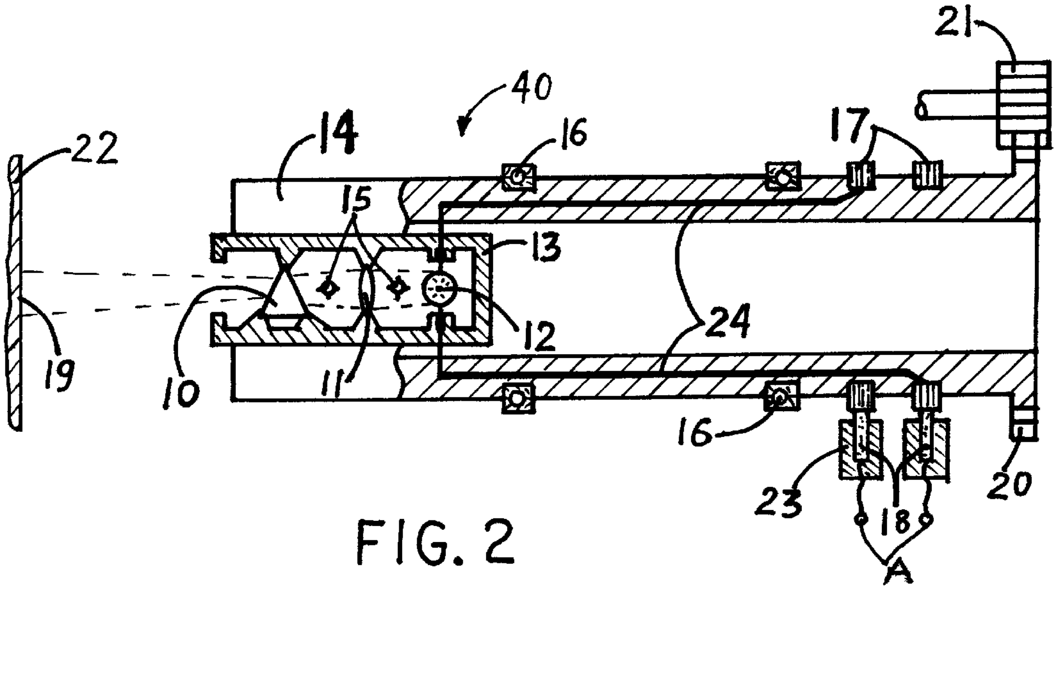
FIG. 2 is a fragmented cross sectional view showing the projecting segment of FIG. 1, in a device to provide a motion for the spectral display.

FIG. 2 illustrates cross sectional elements of FIG. 1 showing the technical details of the rotating projecting segment 40 of the device for projecting the dynamic spectral display. The opaque box or housing 13 of the projecting segment 41, is specially molded to accommodate the light source 12, the convergent lens 11 and the prism 10 of the device. The hollow shaft 14, has the built-in electrical wiring tracks 24 connected to the conductive rings 17 and electrical brushes 18, to enable energizing the light source 12 while it is in the rotating motion. The electrical brushes 18 are placed in a base 23 to keep them in a fixed position to enable to supply electrical energy through terminals (A). This type of an electrical connection is well known in the art. The hollow shaft 14 is powered and driven through the geared wheel 20 by the device's controlling mechanism, such as the geared wheel 21. The rotating hollow shaft 14 is equipped with friction ease means 16, such as bearings to facilitate sliding of the shafts in coaxial manner.

Figure 3:
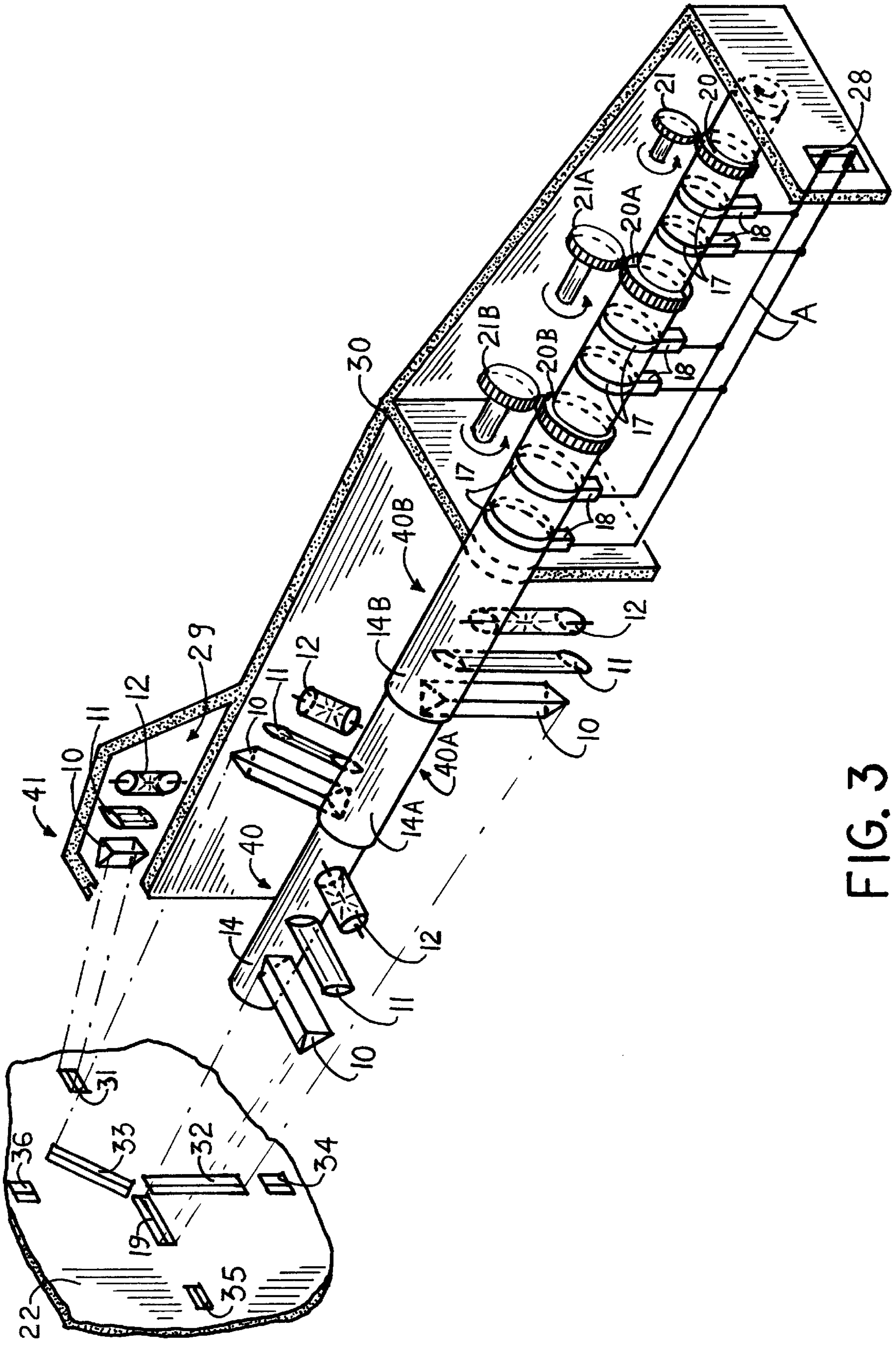
FIG. 3 is a diagrammatic exploded perspective view showing the projecting segments of FIG. 1, combined and coacting with similar segments in a device to provide a projecting for spectral time indicating display.

FIG. 3 shows perspective exploded view of three combined and coacting rotating projecting segments 40, 40A, 40B in the coaxial manner of a clock device mounted in a housing or casing 30, for projecting clock's-like spectral display. The rotating shaft 14 of the projecting segment 40, has the same, but elongated hollow shaft like in FIG. 1, and is composing a common axis for two other remaining segments of the device. The projecting segment 40, attached to the shaft 14 illustrates the projecting of an hour hand spectral marker 19 of the time display onto viewable surface 22, from the light source 12 of the rotating projecting segment 40. The hollow shaft 14 is driven through the geared wheel 20 by the clock's hour controlling geared wheel 21.

The electrical power is supplied from socket 28, through electrical wiring and terminals (A) to the brushes 18 and wiring tracks built-in the shaft (not shown in this FIG. for the sake of clarity) to energize the light emitting source 12 of all rotating projecting segments 40, 40A, 40B. The projecting segment attached respectively to the shaft 14A, for projecting the minute hand spectral marker 33 of the time spectral display, is mounted coaxially on shaft 14 and is driven by the clock's minute controlling geared wheel 21A through a geared wheel 20A of the shaft 14A. The electrical energy supply for the light source 12 of the rotating projecting segment 40A is arranged in the same or similar way as at the segment 40. The projecting segment integrated with shaft 14B, for projecting a second hand spectral maker 32 of the spectral time display, is mounted coaxially on the shaft 14A, and is powered by the clock's second controlling geared wheel 21B through a geared wheel 20B of the hollow shaft 14B. The electrical energy supply (A) for the light source of the above segment is done as described above by the hour and minute projecting segments. Between the hollow shafts 14, 14A, and 14B, there are placed preferably the bearings or some other means to ease the friction between them, (not shown for the sake of clarity).

The same projecting segments 41, are accommodated and mounted stationary inside of a molded chamber 29, and are independent from the rotating shafts. The segments 41 are projecting an hour reference or designation 31 and 34, 35, 36 of the spectral time display and are energized by the electrical power (not shown for the sake of clarity) in a way well known in the art. There can be four or twelve of the segments 41 installed in each device for projecting an hour designation of the spectral time display.

The drawing of FIG. 3 indicates displayed time is 9:05:30. The various clock's controlling mechanisms are well known in the art therefore not shown on this drawings.

Figure 4:
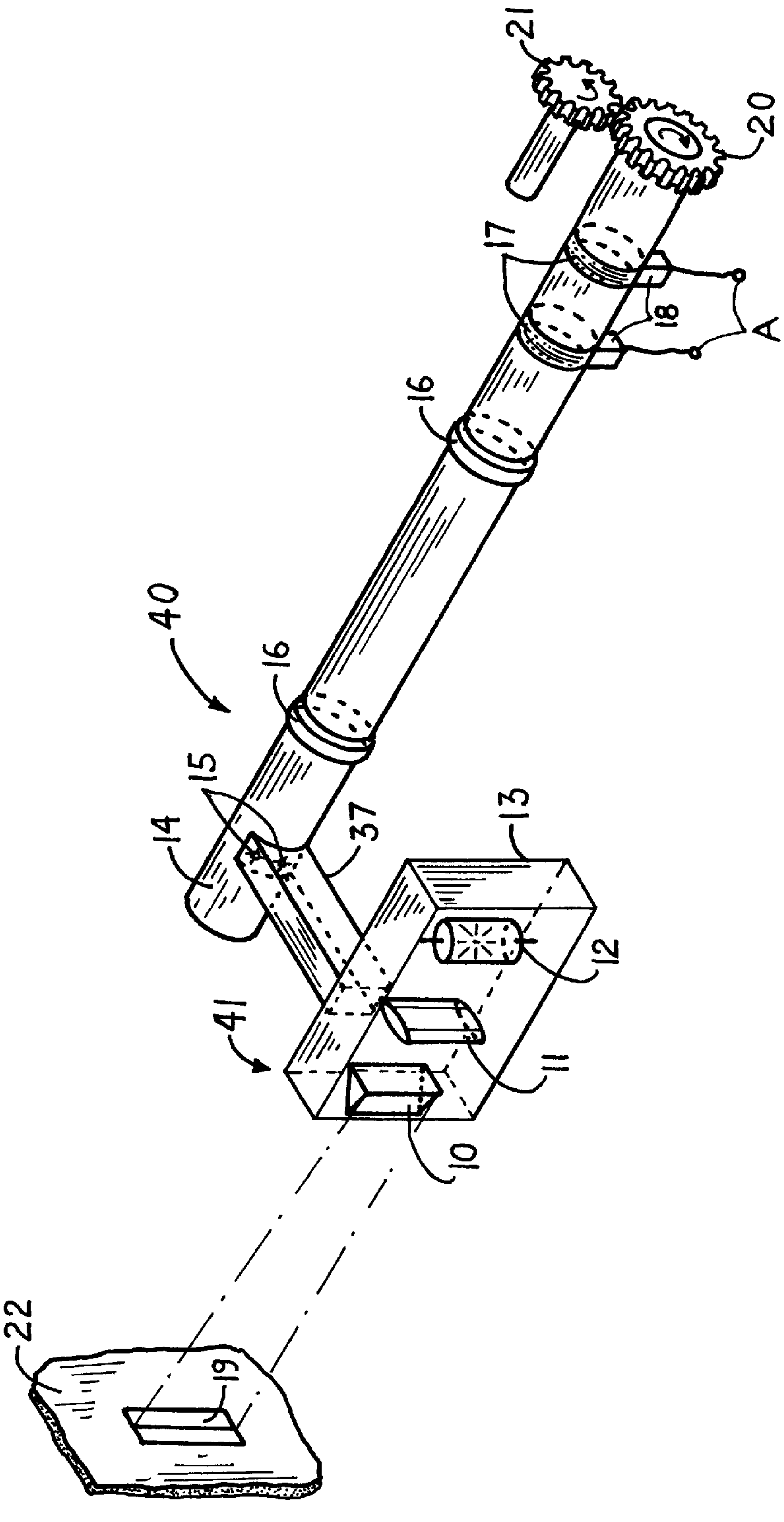
FIG. 4 is a diagrammatic exploded perspective view of a rotating projecting segment of a device with the same structure as in FIG. 1, but a variation of it with different spatial orientation of the projecting segment.

FIG. 4 illustrates a rotating projecting segments 40 for the dynamic spectral display, which is structurally and materially the same as shown in FIG. 1, but represents a possible variation of it.

FIG. 4 introduces the projecting part 41 of the rotating segment 40 oriented spatially in order to project a spectral marker 19, which is perpendicular to the radius of the viewing surface, as it is different in FIG. 1, wherein the projecting part of the segment is oriented parallelly to project a parallel spectral marker 19 to the radius of the viewing surface.

In the further embodiment, the device for projecting spectral display in the motion may have numerous projecting segments, contained in covered box 13, spaced from the shaft 14, through elongated means 37, such as beams or small bridges like structures for a desired distance, or specially adjusted at angle in relationship to the main axis of the device, to enable creating more variety of the dynamic spectral displays.

Considering the above description as a sufficient disclosure of the specifications, these should not be construed as a limitation on the scope of the invention, but rather numerous changes of the structures above disclosed and described will inspire those skilled in the art. And of course, it is understood that the present disclosure relates to preferred embodiments of the invention which are for purposes of illustration only.

I claim:

1. A device composed of:

a casing;

spectral light projecting means arranged in a relative and a corresponding order to each other for projecting a spectral display onto a viewing surface, wherein said spectral projecting means are integrated with rotating motion means arranged coaxially for projecting spectral display in a motion onto said viewing surface;

said projecting means are attached to said rotating motion means, thus comprising rotating spectral projecting segments, and rotating upon coaxial based means, and acting together for projecting a desired spectral display in the motion;

each of said projecting segments including a light emitting source, light convergent means, and diffraction means for effecting a spectral dispersion of the light rays and projecting same onto said viewing surface; and each of said rotating motion means providing electrical wiring means, and also a mechanical connection and power means.

2. The device of claim 1, wherein said projecting means and said rotating means are mounted inside of said casing.

3. The device of claim 1, wherein each of said rotating means is a hollow shaft, that provides built-in electrical wiring tracks made up of wiring connected to conductive rings to energize said projecting segments.

4. The device of claim 1, wherein each of said rotating shafts are sliding coaxially upon each other on a coaxial based shaft.

5. The device of claim 1, wherein each of said rotating shafts also includes a geared wheel through which mechanical connection and power is received.

6. The device of claim 1, wherein said rotating shafts are equipped with friction ease means.

7. The device of claim 1, wherein attachment means of said projecting segments to said rotating shafts are provided.

8. The device of claim 1, wherein said projecting segments are covered with opaque means providing a window with a view of said viewing surface to enable an uninterfered spectral projecting.

9. The device of claim 1, wherein said device is of such a structure, so that spectral projecting is in a form of clock's like display, where at least three of said rotating projecting segments display corresponding to spectral markers in the form of an hour indicating hand, a minute hand and a second hand on said viewing surface.

10. The device of claim 1, wherein said casing of said device provides an accommodation for electrical brushes linking said conductive rings with electrical wiring circuits connecting through an electrical socket, to receive an electrical power.

11. The device of claim 1, wherein numerous said spectral rotating projecting segments arranged coaxially include segments projecting spectral markers perpendicularly to a radius of said viewing surface for projecting a spectral dynamic display onto said viewing surface.

12. The device of claim 11, wherein a number of said spectral projecting segments in said coaxial arrangement combined with said segments of parallel projecting orientation with said segments of perpendicular projecting orientation are projecting said spectral dynamic display.

* * * * *